United States Patent
Cowling

[15] 3,686,367
[45] Aug. 22, 1972

[54] 3-HYDROXY-4-BENZOYPHENYL CYCLIC PHOSPHATES

[72] Inventor: Ronald Cowling, Hexagon House, Manchester, England

[22] Filed: Dec. 12, 1969

[21] Appl. No.: 884,736

[30] Foreign Application Priority Data

Dec. 24, 1968 Great Britain..........61,374/68

[52] U.S. Cl............260/937, 260/45.8 R, 260/45.95, 260/814, 260/927 R, 260/936, 252/400
[51] Int. Cl.........................C07d 105/04, B01j 1/16
[58] Field of Search...........260/936, 937, 927, 927 R

[56] References Cited

UNITED STATES PATENTS 2,661,366   12/1953   Gamrath....................260/937

Primary Examiner—Joseph Rebold
Assistant Examiner—Anton H. Sutto
Attorney—Cushman, Darby & Cushman

[57] ABSTRACT

Cyclic phosphates containing 2-hydroxybenzophenone residues are prepared by reacting monochloro cyclic phosphate esters with 2-hydroxybenzophenones or derived compounds which contain a second reactive hydroxyl group or by reacting dichlorophosphate esters in which the esterifying group is or contains a 2-hydroxybenzophenone residue with a dihydroxy compound wherein the hydroxyl groups are so positioned that a cyclic phosphate ester is formed. The cyclic phosphate esters are stabilizers for organic materials, especially polymers, against degradation by heat, light or oxidation.

2 Claims, No Drawings

3-HYDROXY-4-BENZOYPHENYL CYCLIC PHOSPHATES

This invention relates to phosphates and more particularly to compounds containing 2-hydroxybenzophenone residues and cyclic phosphate groups of value as stabilizers for organic materials against degradation by light, heat and oxidation.

According to the invention there are provided as new compositions of matter phosphates which contain one or more 2-hydroxybenzophenone residues and one or more cyclic phosphate groups.

The 2-hydroxybenzophenone residue may be attached to the remainder of the molecule of the phosphate in any convenient manner but is preferably attached through an oxygen atom placed at the 4', or especially, the 4 position. The remainder of the molecule of the phosphate may however be in two or more parts attached for example through oxygen atoms placed at the 4 and 4' positions of the 2-hydroxybenzophenone residue.

The 2-hydroxybenzophenone residue may also carry other substituents such as alkyl, aryl, aralkyl, alkoxy, aryloxy, aralkoxy, alkoxycarbonyl, aryloxycarbonyl, aralkyloxycarbonyl, carbamoyl, alkylcarbonamido, arylcarbonamido, aralkylcarbonamido, cyano, alkylcarbonyl, arylcarbonyl, aralkylcarbonyl, halogeno and nitro.

As cyclic phosphate groups there is meant any group of the formula:

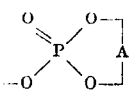

wherein A is a bivalent radical attached to the two oxygen atoms in the ring through carbon atoms.

As examples of bivalent radicals represented by A there are mentioned alkylene radicals such as ethylene, 1,2-propylene, 1,3-propylene and 1-methyl-1,3-propylene, substituted alkylene radicals such as 2,2-dimethoxymethyl-1,3-propylene, phenylethylene, tetradecylethylene and 1,2-bis-ethoxycarbonylethylene, arylene radicals such as o-phenylene, 1,8-naphthylene and 2,3-naphthylene, substituted arylene radicals such as 4-methyl-1,2-phenylene, 4-chloro-1,2-phenylene and 3-nitro-1,2-phenylene and aralkylene radicals such as 1,1'-tolylene and 4-chloro and 4-methyl substituted derivatives thereof.

The radical A may contain further cyclic phosphate groups and/or further 2-hydroxybenzophenone residues, as for example in the bicyclic phosphate esters from pentaerythritol each phosphorus atom of which may be linked to a 2-hydroxybenzophenone residue through a non-cyclic oxygen atom of the phosphate group.

The cyclic phosphate group may also be a bicyclic group in which a third oxygen atom is also attached to the radical A. In such groups the radical A will also carry an unsatisfied valency or linking group to provide means of attachment to the remainder of the phosphate molecule.

It is preferred that A be ethylene, 1,2-propylene, 1,3-propylene or 1-methyl-1,3-propylene.

The 2-hydroxybenzophenone and cyclic phosphate group may be attached through a noncyclic oxygen atom of the phosphate group which is attached directly to one of the phenyl nuclei in the 2-hydroxybenzophenone residue, or may be attached through a linking group attached at one point to a noncyclic oxygen atom or to some other atom in the phosphate group and at another point to the 2-hydroxybenzophenone residue either directly or through an oxygen or other atom attached to the 2-hydroxybenzophenone residue. Such linking groups may for example be alkylene or ester linkages such as carboxylic ester or phosphate ester linkages.

Alternatively the 2-hydroxybenzophenone residue may provide part of the cyclic phosphate group as for example in the cyclic esters derived from 2,4,5-trihydroxybenzophenone, one remaining noncyclic oxygen of the phosphate group carrying for example an alkyl group.

As examples of phosphates of the invention there are mentioned: 2-oxo-2-(3-hydroxy-4-benzoylphenoxy)-1,3,2-dioxaphospholane, 2-oxo-2-(3-hydroxy-4-benzoylphenoxy)-4-methyl-1,3,2-dioxaphosphorinane, 2-oxo-2-(3-hydroxy-4-benzoylphenoxy)-1,3,2-dioxaphosphepane, 2-oxo-2-(3-hydroxy-4-benzoylphenoxy)-5,5-dimethoxymethyl-1,3,2-dioxaphosphorinane, 3,9-bisoxo-3,9-bis[3-hydroxy-4-benzoylphenoxy]-2,4,8,10-tetraoxa-3,9-diphosphaspiro-(5,5)-undecane, 2-oxo-2-[2-(3-hydroxy-4-benzoylphenoxy)ethoxy]-1,3,2-dioxaphosphorinane, 2-oxo-2-(3-hydroxy-4-benzoylphenoxy)-1,3,2-benzodioxaphosphole, 2-oxo-2-(3-hydroxy-4-benzoylphenoxy)-6-methyl-4H-1,3,2-benzodioxaphosphorinane, 2-oxo-2-butyloxy-5-benzoyl-6-hydroxy-1,3,2-benzodioxaphosphole, 2-hydroxy-4,4'-bis-(2-oxo-4-methyl-1,3,2-dioxaphosphorinan-2-yloxy]benzophenone.

The phosphates of the invention may be prepared in any conventional manner. For example a monochlorocyclic phosphate ester may be reacted with a dihydroxybenzophenone, such as 2,4-dihydroxybenzophenone, or with a compound of 2-hydroxylbenzophenone having a linking group containing a reactive hydroxyl group. Alternatively for example a dichlorophosphate ester in which the esterifying group is or contains a 2-hydroxybenzophenone residue is reacted with a dihydroxy compound wherein the hydroxyl groups are so positioned that a cyclic phosphate ester is formed. These reactions may be carried out by well-known procedures for similar reactions, for example by mixing the reactants optionally in a solvent at room temperature or at a higher temperature. If necessary an acid binding agent such as pyridine, methylamine, dimethylaniline or sodium carbonate is added.

According to a further feature of the invention there are provided organic compositions stabilized against degradation by light, heat or oxidation, which contain a phosphate as defined above in stabilizing amount.

As examples of organic compounds or materials which may be stabilized by the phosphates of the invention there are mentioned particularly polymeric materials such as natural and synthetic rubbers such as cispolyisoprene, cispolybutadiene, butadiene-styrene copolymers, polyolefins such as atactic and isotactic polyethylene and polypropylene, poly-(4-methylpentene-1), polystyrene, polyesters, polyethers, polyacrylates and polymethacrylates, polyacrylonitrile, polyvinylidene chloride, polyvinyl chloride, polyamides such as polyhexamethylene adipamide and polyaminocaproic acid, and polyurethanes.

The phosphates are especially effective as stabilizers for polyolefins.

The phosphates should be present in the composition in amount from 0.05 to 5 percent, and preferably from 0.1 to 2.0 percent of the weight of organic materials requiring stabilization.

The phosphate may be incorporated into the organic material by any conventional method. In the case of polymers it may be for example dissolved in a low boiling solvent which is then mixed with the polymer in powder form and evaporated, or it may be mixed mechanically with the polymer or mixed by extrusion compounding.

The phosphates may be used alone or in conjunction with other conventional additives such as plasticizers, antistatic agents, pigments, dyes and fillers. Especially when used in polyolefins the addition is desirable of other antioxidants such as phenolic compounds, especially hindered phenols such as 1,1,3-tris-[2-methyl-4-hydroxy-5-t-butyl-phenyl]butane, stearyl 3-[3,5-di-tert.-butyl-4-hydroxyphenyl]-propionate, tetrakis-[3-(3,5-di-t-butyl-4-hydroxyphenyl)-propionyloxymethyl] methane, metal salts or esters of thiodipropionic or thiodibutyric acids, dialkyl sulphides, salts or esters of dialkyldithiocarbamates, dialkyldithiophosphonic acids or salts or esters thereof, alkyl or aryl phosphites or thiophosphites, salts or esters of phosphorus acids or thio-acids, esters of boric acid, other light stabilizers such as substituted benzophenones, benzotriazoles, cinnamic acid derivatives, salicylates, nickel chelates of o-hydroxyacetophenone oxime and alkyl derivatives thereof.

The phosphates of the invention are easy to incorporate into organic material, are stable compounds, and do not give obnoxious odors during hot processing. By use of the phosphates of the invention organic materials are stabilized to a high degree against degradation by heat, light or oxidation without significant discoloration of the organic material. Polyolefins in particular, especially when containing also antioxidants of the hindered phenol type, are stabilized to a high degree to processing conditions and have a long service life.

The invention is illustrated but not limited by the following Examples in which all parts and percentages are by weight unless otherwise stated.

EXAMPLE 1

A solution of 32.1 parts of 2,4-dihydroxybenzophenone and 11.8 parts of pyridine in 143 parts of ether is stirred at 20° C. under a slow stream of nitrogen and there is added over 1 hour a solution of 25.6 parts of 2-chloro-2-oxo-4-methyl-1,3,2-dioxaphosphorinane in 21 parts of ether. After completion of the addition the reaction mixture is stirred at room temperature for 1 hour and at the boiling point for 30 minutes. After cooling to room temperature there is added 285 parts of ether and the mixture is stirred overnight. The ether layer is removed by decantation and the residue further extracted with 4 × 353 parts of ether. The combined ether extracts are filtered and evaporated under reduced pressure.

The residue after evaporation of the ether is dissolved in 440 parts of benzene and the solution is extracted with 4 × 500 parts of 5 percent aqueous sodium carbonate solution. After drying the solvent is evaporated under reduced pressure to give 2-oxo-2-[3-hydroxy-4-benzoylphenoxy]-4-methyl-1,3,2-dioxaphosphorinane as a white solid.

EXAMPLE 2

2-Oxo-2-[3-hydroxy-4-benzoylphenoxy]-4-methyl-1,3,2-dioxaphosphorinane (A) is well mixed polypropylene powder together with a commercial antioxidant 1,1,3-tris-[2-methyl-4-hydroxy-5-t-butylphenyl]butane (B) and dilauryl thiodipropionate (C). A portion of this mixture is pressed onto 0.75 mm film using a steam heated press at 185° C. A second portion is extruded from a screw extruder with a melt temperature of 250° C. and the extrudate is then pressed into 0.75 m film as before. Both films are exposed to UV irradiation in a Xenon arc type of light ageing apparatus designed to simulate daylight conditions and the time to film embrittlement is noted.

A commercial stabilizer 2-hydroxy-4-octyloxybenzophenone (D) is similarly incorporated into polypropylene and the films formed are simultaneously tested in the same manner.

The results, shown in Table 1, illustrate the superiority of 2-oxo-2-[3-hydroxy-4-benzoylphenoxy]-1,3,2-dioxaphosphorinane.

TABLE I

| Film Formed from | % Additives in Polypropylene | | | Embrittlement Time |
|---|---|---|---|---|
| | A | B | C | D (hrs) |
| Pressed | 0.5 | 0.1 | 0.25 | — 775 |
| Powder | — | 0.1 | 0.25 | 0.5333 |
| Pressed | 0.5 | 0.1 | 0.25 | — 775 |
| Extrudate | — | 0.1 | 0.25 | 0.5429 |

I claim:

1. A cyclic phosphate of the formula

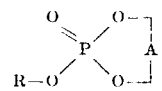

wherein R is a 3-hydroxy-4-benzoylphenyl group and A is ethylene, 1,2-propylene, 1,3-propylene and 1-methyl-1,3-propylene, 2,2-dimethoxymethyl-1,3-propylene, phenylethylene, tetradecylethylene, 1,2-bis-ethoxycarbonyl-ethylene, o-phenylene, 1,8-naphthylene and 2,3-naphthylene, 4-methyl-1,2-phenylene, 4-chloro-1,2-phenylene, 3-nitro-1,2-phenylene, 1,1'-tolylene and 4-chloro and 4-methyl substituted derivatives thereof.

2. A cyclic phosphate as claimed in claim 1 wherein A is ethylene, 1,2-propylene, 1,3-propylene or 1-methyl-1,3-propylene.

* * * * *